Aug. 1, 1967 R. H. GILBERT 3,334,163
METHOD OF MOLDING FRICTION ELEMENTS
Filed Aug. 22, 1966 2 Sheets-Sheet 1

Inventor
RICHARD H. GILBERT
By Wallace, Kinzer and Dorn
Attorneys

Aug. 1, 1967   R. H. GILBERT   3,334,163
METHOD OF MOLDING FRICTION ELEMENTS
Filed Aug. 22, 1966   2 Sheets-Sheet 2
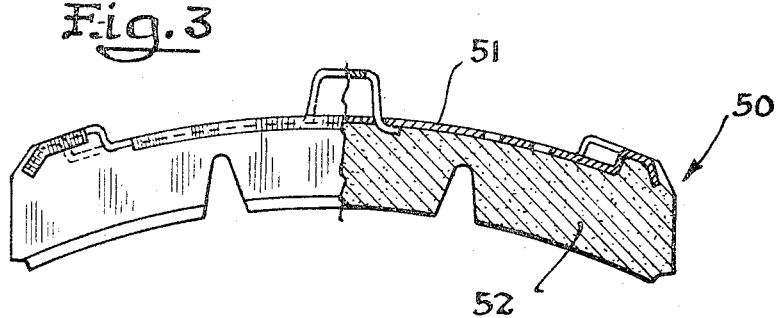
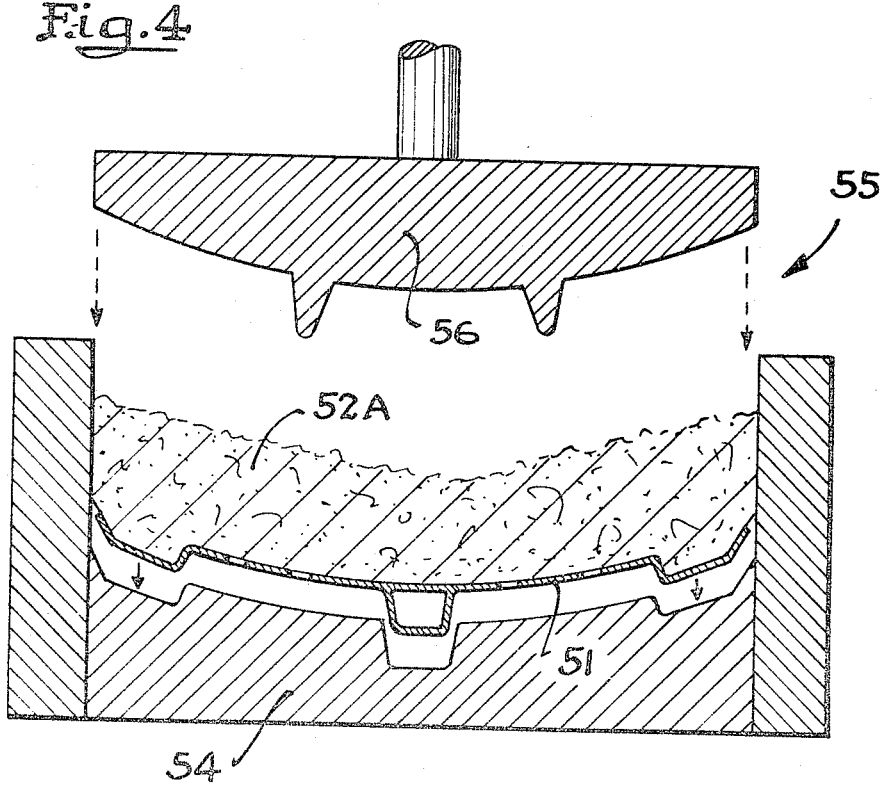
Inventor
RICHARD H. GILBERT
By Wallace, Kinzer and Dorn
Attorneys

United States Patent Office 3,334,163
Patented Aug. 1, 1967

3,334,163
METHOD OF MOLDING FRICTION ELEMENTS
Richard H. Gilbert, Ramsey, N.J., assignor to Abex Corporation, New York, N.Y., a corporation of Delaware
Filed Aug. 22, 1966, Ser. No. 574,088
8 Claims. (Cl. 264—68)

This application is a continuation-in-part of application Ser. No. 506,768 filed Nov. 8, 1965 which in turn was a continuation-in-part of application Ser. No. 188,648, filed Apr. 19, 1962, now abandoned. This invention relates to composition friction elements and in particular to those that are inclusive of inorganic filler ingredients bonded by a thermosetting organic binder.

Composition friction elements such as brake linings, clutch facings and the like are conventionally composed of long-wearing filler particles and an organic thermosetting binder in a highly densified state. Densification is ordinarily obtained by consolidating the mixed ingredients in a press for a substantial period of time while employing relatively high temperatures to cure the binder. The binder becomes the matrix containing the dispersed phase represented by the fillers.

The filler particles may be of a wide variety depending upon the ultimate friction and wear characteristics desired. For example, the filler particles ordinarily include a heat-resistant reinforcer such as asbestos, and in addition, metallic particles such as cast iron and/or friction enhancing minerals. It is also customary to include other friction enhances such as polymers derived from cashew nut shell oil, and friction modifiers such as various forms of graphite and/or lead sulphide.

The binder is usually predominantly a thermosetting material such as a straight phenolic resin, a modified phenolic resin or a cashew resin or, as is more likely, a mixture of these with rubber. Thus, the hardness of a straight phenolic binder can be modified by the presence of softer resins such as oil modified phenolics or liquid cashew resin, or by an elastomer such as natural or synthetic rubber or by other suitable electomeric materials. In any event, the binder ingredients are usually inclusive of solid particles such as partially cured phenol formaldehyde resin, partially cured cashew resin polymer solids, and unvulcanized butadiene-styrene or buta-diene acrylonitrile copolymer solids conventionally admixed with a solvent in order to obtain flowability sufficient to achieve uniform distribution of the potentially heat settable binder throughout the remainder of the composition represented by the heat resistant, long-wearing, strengthening, and friction enhancing and friction modifying filler particles.

The solvent is only a processing aid and must eventually be removed if adequate bond strength and density in the final cured product are to be obtained. In fact, it is customary under present practices to bake the mixture containing the solvent for a prolonged period of time at an elevated temperature to remove the solvent. The difficulty with such procedures is lack of certainty for the end point of solvent removal, which is to say that the mixture may be (and sometimes is) baked more than necessary to remove solvent, resulting in disadvantageous effects, and in particular objectionable surface reactions.

This baking or drying operation also consumes a considerable amount of time and labor, and entails obvious capital expenditures, as can be well appreciated from the fact that the drying or solvent-removing operation sometimes requires more than fifty percent of the total time in processing a given batch of material to afford a composition friction element.

Moreover, the dies required for exerting heat and pressure conjointly for cure (hereinafter referred to as "compression molding") not only entail a high initial cost, but are costly to maintain, and a large number are required for the many different shapes and sizes of friction elements encountered. These molds must be frequently opened for venting during the initial stages of cure to permit the escape of trapped air and gases evolved during chemical reaction of the cure. While such venting is frequently done automatically, it becomes very difficult with the wide range of binder chemistry to determine the optimum time for venting, such that a compromise is always entailed. The final closure of the dies at the end of the venting cycle probably traps some traces of gases which are believed to react chemically with the binder in its final stage of cure. In the instance of a phenolic resin binder, the major portion of the cure reaction is one of condensation involving the elimination of water vapor during a "venting" sequence, in contrast to sulphur reaction gases eliminated during the early stages of cure for those binders involving rubber as a constituent. When both a phenolic resin and a rubber are employed for the binder, the curing reaction involves copolymerization and the chemistry becomes quite complex.

I have discovered a way of satisfactorily producing thick composition friction elements, which may be one inch or more in thickness, without the need for relying upon expensive and time-consuming dies of the character described above, and in accomplishing this as the primary object of the present invention, I avoid subjecting a solvent-free mixture to any appreciable thermal cure for the thermosetting bond while being pressed or stamped to final density in a die. To the contrary I advance the bond sufficiently to eliminate most of the products of cure before final cure and merely press the mixture of bond and filler ingredients to final density while the mixture is still warm or at a temperature sufficient to assure that the bond ingredient is maintained in a tacky, adhesive state during densification and of sufficient adhesive power as to resist formation of pores within the densified body during the final cure stage of processing. Thus, the binder, when the mixture is pressed to final density, possesses adhesive power in excess of the vapor pressure exerted by the gases of reaction escaping during final cure, and to such an extent that the density attained is essentially the same as the density attained in a conventional compression molding process.

As a consequence, the bond in the pressed body removed from the die exhibits sufficient tenacity and adhesiveness toward the filler particles (and cohesiveness within itself) that the gases evolved in final cure filter through the body and escape without disrupting the bond or its adhesiveness to the fillers.

The essential feature of my invention is to advance the resin binder, prior to densification, to that point of adhesive power where the mixture, after pressing, will maintain its density during final cure even though normally disruptive gases are being evolved.

The mixture being pressed may of course have an insignificant or immaterial amount of solvent present which could not or was not removed purely as a practical matter in not being able to determine precisely the "end point" of complete solvent removal. Consequently, I am concerned with the circumstance where the mixture being pressed to its final density is devoid of solvent for all practical purposes. In other words, I subject the pressed body to a final cure outside the pressing die, and, because the interfering portion of the products of cure have already been removed, need not exert pressure to maintain density during final cure because the strength of the bond is greater than the vapor pressures of any remaining escaping volatiles that may be evolved in the course of the chemical reaction characterizing the cure of the bond to its final insoluble, infusible state regardless of whether the volatiles are solely the products of cure or a small amount of residual, occluded solvent that could not be removed.

Viewed in yet another way, the binder in the product removed from the stamping die is tacky and advanced only to the degree of cure where the final curing reaction takes place faster than reduction of bond viscosity so that adhesive-cohesive strength and density are maintained.

It may appear at first that I am merely proposing to do in two steps what has heretofore been done in one step insofar as concerns densifying the composition friction element mixture as a whole and subjecting the bond ingredient to a final cure. This is by no means the case, since the cost savings under my process are substantial in that I need only use a stamping press to attain final density and desired shape, and the stamped mixture can be cured in conventional ovens or other suitable means. This equipment, though separate, enables much higher production rates to be achieved. Thus, the conventional compression molding presses entail several hours for processing a given batch whereas I attain final density in a matter of about a minute or less. In this connection, it is important to realize that the attainment of final density, near theoretical, when using conventional compression molding presses is really achieved in cycles over a period of several hours in that after such venting of the press to open the dies for escape of volatiles, there is some expansion of the body being pressed, or loss in density, due to the disruptive pressure of the evolved gases.

In other words, the conventional compression molding process can be viewed as one wherein densification and cure progresses in cycles over a relatively long period of time; but under the present invention I attain final density almost instantly, in about a minute, at least within the operating speed of the stamping dies and the rate at which the mixture can be compacted, and when completing the thermal cure I need use no more pressure than the slight amount which may be necessary to maintain the desired shape against warpage.

Accordingly, a more specific object of the present invention is to produce thick, composition friction elements, composed of filler and strengthening ingredients together with a thermosetting bond, by subjecting the mixture, devoid of a solvent for all practical purposes, to final density in a stamping die while the bond ingredient is in a warm, tacky, adhesive state so that the pressed body, removed from the die, will maintain its density during final thermal cure without the need for any further densifying pressure. Thus, the mixture which I press is one in which the solid bond particles are quite plastic and adhesive such as to result in permanent deformation and sufficient cohesion between the bond and filler-strengthener particles that the pressed body will not "recover" or spring back during thermal cure even though gases may be evolved during the course of the chemical reactions characteristic of a final thermal cure of a reactive organic bond.

This phenomenon during stamping is to be compared to the reaction which takes place in conventional compression molding where the pressure of the dies, once released when venting the dies to expunge volatiles, must be reapplied in the next cycle of the conjoint action of heat and pressure necessary to reconsolidate the bond which becomes more and more viscous and really decreases in adhesive power as the cure reaction progresses.

In fact, the last stage in the conventional process is one where the bond becomes a continuous consolidated matrix with the fillers and strengtheners dispersed therein as a discontinuous phase. In contrast, the mixture which I stamp out in a quick stroke of the press and which is to be cured outside the stamping die, requires no further consolidation since the bond is in a fluid, stringy, tackified state, still somewhat discrete, bonding to itself and to the filler and strengthening particles. It is not until final cure, separately and outside the press, that the bond ingredient in my process completely fuses into a continuous matrix, but in the meantime during thermal cure its adhesive-cohesive power continues to hold the whole mass together and maintain the stamped density even though gases exerting high vapor pressure are being interiorly generated.

It would appear that in my process, where I stamp a substantially solvent-free mixture containing a thermosetting bond in a warm, tacky state, that in reaching this state by heating the bond, that most (but by no means all) of the gaseous products of resin or rubber cure have already been evolved, but not to the extent that final cure has occurred. I have observed this condition in separate tests where a resin bond ingredient per se, initially in a liquid (solvent-free) or powder state, when heated sufficiently, will commence to bubble rapidly (the powdered resin will first liquify). Bubbling to any marked extent eventually subsides, and the resin then commences to increase rapidly in viscosity (gaseous products of cure continue to be evolved to a lesser extent) until finally the insoluble infusible state is reached characterizing complete cure. In any event, it is essential in my process that the mixture when pressed present a thermosetting bond ingredient that is tacky, for the purpose above described, but certainly short of its final cure state, and that this be the state of the bond ingredient when the stamped mixture is removed from the die and transferred to the heating equipment where final thermal cure is effected without pressure for any further consolidation.

The state for the bond above described is preferably attained outside the stamping press in the interest of economy. However, it may be advantageous to heat the dies to avoid cooling, or even to reach the tacky state described, but this mode of operation of course would add to the expense of the dies.

The conventional "bake-out" technique to remove solvent results in a stage where the resin or resin-rubber bond passes through (and in actual practice beyond) the very tacky state which is the state in which I stamp and remove the stamped body from the pressing die. However, the conventional technique also entails allowing the mixture, freed of solvent, to cool back to room temperature where tackiness is further lost, and it is this room temperature mixture which is compacted in a compression molding press, whereas in my process there is complete continuity in that the binder has not been advanced beyond the tacky, adhesive and/or cohesive state, and is initially pressed while that state prevails.

To the best of my knowledge, no one has heretofore discovered or even recognized the results that can be unexpectedly realized by stamping thick mixtures of the kind I employ for composition friction elements while the thermosetting bond is in a tacky, adhesive-cohesive and preferably warm state. In fact, it was probably the advanced state, beyond a tacky-adhesive state in the conventional process, that heretofore has prevented these results from being realized, since a thermosetting binder advanced beyond the tacky adhesive state does not display particularly good adhesive qualities, and therefore necessitated the need for reconsolidation after venting in the conventional compression molding press in order to re-establish density an eliminate porosity caused by the disruptive influence of the gaseous products released during the stages of final cure.

It will also be recognized from the foregoing that productivity in the manufacture of composition friction elements could also be materially improved if it would be possible to eliminate the need for a solvent under circumstances where the bond ingredients are nevertheless homogeneously spread throughout and "wet" the filler particles. The accomplishment of this represents another object of the present invention. Specifically in this regard, it is an object of the present invention to churn the essentially dry filler particles and bond ingredients in a composition friction element with such intensity in a confined chamber as to generate enough heat, due to internal friction, to cause the solid bond ingredients to soften and partially advance to a state where the filler particles are uniformly wetted by the bond ingredients in a tacky state, resulting in a churned mixture containing a solvent-free, partially advanced, evenly distributed binder that can be immediately pressed and densified in the shape desired for the friction element, and to do this while continuously creating such a churned mixture.

However, my invention may also be practiced by spreading the bond by means of a solvent so long as the mixture undergoing stamping to final density is for all practical purposes devoid of solvent with the bond in the tacky state, as described above. It will be appreciated that if a large amount of solvent were present during stamping I could in no wise achieve final density, because the solvent, being a liquid, is incompressible, and evolution of solvent during subsequent cure would result in a large amount of porosity or significant loss of density.

Other and further objects of the present invention will be apparent from the following description and claims demonstrative of what is now considered to be the best mode contemplated for applying the principles of the present invention. Other embodiments of the invention embodying the same or equivalent principles may be used and changes may be made as desired by those skilled in the art without departing from the present invention.

In the drawings:

FIG. 3 is an elevation, partly in section, of a finished railroad brake shoe; and FIG. 4 is a schematic sectional view of die equipment used to make the shoe shown in FIG. 3.

Figure 1:
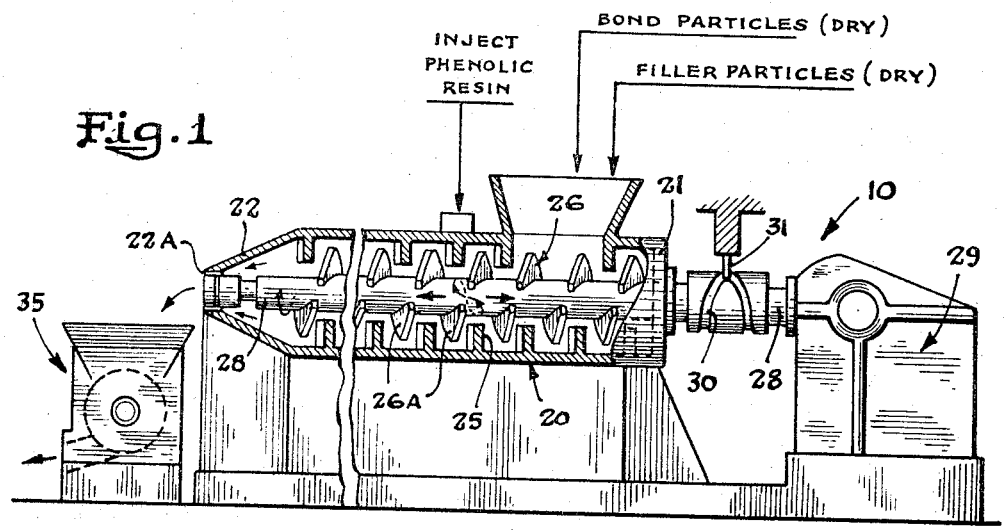
FIGS. 1 and 2 are sectional views of apparatus that may be employed in practicing the present invention.

Under and in accordance with one mode of practicing the present invention, the dry solid "filler" ingredients, and an extremely viscous, sticky binder ingredient to be used in affording a thick (one inch or more) composition friction element, such as a railroad brake shoe or the like, are introduced into a chamber where intensive working is to occur as will be explained in detail. This chamber is defined at one end by a wall having a restricted opening therein through which the churned product hereinafter identified is to be continuously extruded. The solid ingredients are inclusive of the fillers referred to above which may be of various kinds, as well as solid bond ingredients. The bond ingredients will vary depending upon the hardness of the binder desired, which may vary widely depending upon end use and effect on the opposing surface such as the tread of a railroad car wheel. Thus, the bond ingredient may be a straight phenolic—liquid or solid; an oil modified phenolic—liquid or solid; a thermoplastic modified phenolic such as polyvinyl butyral or a liquid or solid cashew resin polymer, each in an incompletely cured state; or natural or synthetic rubber, such as butadiene-styrene copolymer particles that are incompletely vulcanized; or mixtures thereof. Though the binder used may be in a liquid state, it will be appreciated that this eventually, when cured, deposits a solid, and hence even a binder that is initially liquid has a "solids" content.

The foregoing ingredients introduced into the chamber are to be subjected to such intensive working in the chamber, while being continuously advanced through the chamber, as to generate enough heat, around 150° F. to 250° F. (depending upon the nature of the bond ingredient) to soften any solid bond ingredients to such a state that the solid bond particles, while being churned with the filler particles, become uniformly distributed therethrough and wet the filler particles sufficiently to approach virtually the state of even distribution and good wetting made possible by using a solvent, although as noted above, the use of a solvent may be avoided as one of the principal aspects of the present invention.

In the course of subjecting the mixture to heat, the major portion (but by no means all) of the gaseous products of cure from the binder are evolved, characterizing a partial advance of the binder to a tacky, adhesive state, just short of a stage of viscosity which would interfere with good flow and adhesiveness of the binder during pressing.

The churned product emitted through the restricted opening in the wall at one end of the chamber contains a binder that has been softened to a tacky state and spread uniformly through the mixture. Resultantly, selected amounts of the extruded, churned product can be pressed and consolidated to the desired shape and density desired for the friction element. However, the churned product emitting from said chamber may be advantageously fluffed and beaten and somewhat reduced in particle size continuously in a hammer mill, such that the product from the hammer mill may be pressed to the shape desired, such as the shape of a railroad brake shoe.

In any event, a predetermined amount of the churned product containing the tacky binder is incorporated in a die cavity having an associated plunger effective, when the press is operated, to produce the desired friction element shape which, after removal from the die cavity, is to be finally cured up to a temperature of about 425° F. Time for the press cycle is about one minute, with only about 15 seconds under pressure.

The following are examples of practices under and in accordance with the present invention:

| Material | Example (Parts by Weight) | | |
|---|---|---|---|
| | 1 | 2 | 3 |
| Binder (A) | 15 | 12.2 | |
| Binder (B) | | | 13.0 |
| White Cast Iron Particles | 10.0 | | 20.0 |
| Calcined Kyanite | 10.0 | 13.0 | 12.0 |
| Lead Sulphide | 19.5 | 22.5 | 15.0 |
| Lead | 4.6 | 5.6 | 5.5 |
| Calcined Petroleum Coke | 21.6 | 39.3 | 25.8 |
| Asbestos (Grade 4K) | 10.8 | | |
| Aloxite | | 0.8 | 0.8 |
| Curing Agent: | | | |
| Litharge | 3.4 | 2.7 | 3.2 |
| Zinc Oxide | 5.1 | 4.2 | 4.7 |

*Example 4 (Binder A)*

Ingredient:                          Parts by weight
    Buna-S (23½% Styrene) _____ 44.0
    Cashew Nut Shell Liquid Polymer
        (Intermediate Stage of Heat Growth) ____ 44.0
    Rubber Cure.—
        Sulphur _____ 8.8
        Benzothiazol Disulphide _____ 0.91
        Copper Dimethyl Dithiocarbamate _____ 0.46
        Hexamethylenetetramine _____ 1.83

*Example 5 (Binder B)*

Buna-S (3% Styrene; 8% Cumene
    hydroperoxide) _____ 63.8
Rubber Cure:
    Litharge _____ 14.4
    Zinc Oxide _____ 2.18

The above example serve to demonstrate the latitude possible under the essentially physical operating conditions of the present invention. The cast iron particles and calcined kyanite are long-wearing filler particles having a synergistic action explained in U.S. Patent No. 2,901,456; and hence, variations and substitutions are possible if this action is not necessary in the end use. The asbestos is a filler and also a strengthener. Lead, lead sulphide, graphite and coke are fillers present to display advantageous friction modifying and surface effects in the finished article when used in the intended manner in a brake installation, but again omissions and substitutions can be made dependent upon the degree of friction and modification thereof that may be deemed important.

The binder phase is one obtained from solid particles, which in Patent No. 2,901,456, are disclosed to be used with a solvent which of course is unnecessary under the present invention. The binder of Example 5 above will result in a railroad brake shoe somewhat softer than the one which will result from use of Example 4 binder which contains cashew resin. However, an even harder shoe can be made by substituting a phenol-formaldehyde resin, in whole or in part, for either one of the binder ingredients of Example 4.

The filler particles and the bond particles can, if desired, be pre-mixed to a homogeneous state in a dry blender, but this is not essential as will be noted hereinafter. Thus, referring to FIG. 1, the materials that are to be subjected to intensive churning are introduced into a mixer 10 that includes a floor-mounted cylindrical chamber 20. The chamber 20 has a closed rear wall 21, and a forward tapered wall 22 provided with restricted discharge openings 22A. The particles introduced into the chamber 20 are inclusive of the filler particles and the bond particles refered to in Examples 1 to 5, pre-mixed in a blender to a homogeneous state, or even introduced into the chamber 20 in separate streams as shown in FIG. 1.

It is assumed, as shown in FIG. 1, that the ultimate bond or matrix for the fillers is also to include a phenolic resin, initially in a thick viscous A-stage of formation, devoid of solvent when introduced into the mixing chamber. This resin in a preliminary stage of heat advancement, is, in fact, so viscous as to require forced injection, as distinguished from free flow, into the chamber 20 if it is to be used. Even so, the advantage of using a liquid phenolic in this stage of resin growth, having a low volatile content due to absence of solvent, is made possible under the present invention, and again the temperature generated during intense mixing advances the liquid resin to a tacky state with the generation of some of the volatile produces of cure.

It may be noted, however, that thermosettable resins in solid or granular form can be used, such as a powdered or granular Novolac, capable of melting and being pumped in admixture. Examples of other binders will be set forth below.

The mixing chamber 20 is constructed and operated to mix the aforesaid ingredients with such intensity by churning the same with a multidirectional action (indicated by the arrows on shaft 28, FIG. 2) as to cause the solid bond ingredients (and the viscous, solvent-free phenolic if such be used) to soften to such a point where the filler particles are uniformly wetted and contacted thereby. This churning action occurs as the mixture is gradually forced from adjacent the rear wall 21 to the discharge openings 22A in the front wall of the mixer, and the binder in the homogeneous product emitted from the mixer is in a state of partial heat advancement to the extent that it is in a tacky state.

Such intensive action under the present invention is attained by providing the inside wall of the chamber 20 with curved, radially projecting ribs 25 and a reciprocating, segmented, Archemedian screw 26. The screw 26 has segmented or split blades 26A, and the curve of the ribs conforms to the lead angle of the screw for a reason to be mentioned. The screw 26 is provided on a shaft 28 that extends axially of the chamber 20, being mounted in suitable bearings in the walls at the front and rear of the chamber 20. The shaft 28 is rotated by means including a generator-motor combination 29 coupled to the shaft 28 by a gear reduction unit (not shown) and the shaft is reciprocated and repeatedly axially of chamber 20 by a spiral cam 30 and an associated fixer follower 31.

When the aforesaid motor is in operation and when the shaft 28 is coupled thereto, the latter reciprocates in guides associated with the aforesaid bearings. As this is occurring, the blades 26A defining the screw 26 are rotated to gyrate and tumble the mixture and are simultaneously reciprocated to rake the mixture, and the parts are so related that the division or space between the blades 26A is presented to the curved ribs 25 to move therealong, thereby resulting in continuous churning of the mixture fed to the chamber 20. At the same time, the mixture being churned is gradually moved from adjacent the near wall 21 through the discharge openings 22A at the front wall 22.

It will be realized that the mixture introduced to the chamber 20 to be churned and raked therein may be quite dry, and in fact offers a great deal of frictional resistance to the action of the oscillating Archemedian screw 26 and the cooperating ribs 25. This resistance plus that offered by the ribs 25 is of sufficient magnitude to generate enough heat by the internal friction involved to soften the bond particles. There may be some curing or partial advancement of the binder, but this does not occur to the extent that the binder loses its tacky, adhesive character which is an important aspect of the present invention. The magnitude of this can be visualized from the fact that the mixer 10 typically can be operated to exert up to fifteen horsepower net on the materials in the chamber 20 which itself may be twenty-eight inches long and four inches inside diameter, processing four and one-half pounds of material per minute. "Net" horsepower excludes friction losses and the like required to turn over the motor.

As noted, the mixture extruded through the openings 22A is one wherein the bond particles are tacky, and hence the mixture is in a state to be immediately densified to virtually theoretical density. However, before adding selected amounts of the churned product to die cavities, the churned mixture may be advantageously fluffed and beaten in a hammer mill 35, so long as the warm, tacky adhesive state is not lost.

Figure 2:
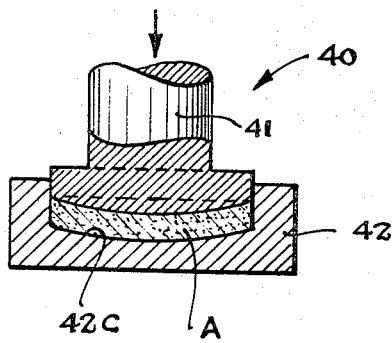

Referring to FIG. 2, there is shown a press 40 having a ram or punch 41 associated with a die 42 formed to have a die cavity 42C configured in accordance with the desired shape of a friction element, such as a railroad brake shoe, to be produced under the present invention. A selected amount of the fluffed product, A, FIG. 2, from the hammer mill 35 is added to the die cavity 42C, and this material may then be densified to about 98% theoretical density by the ram 41. Further in connection with densification in the press, it may be mentioned that the product undergoes compression to a 4:1 to 5:1 bulk factor. This is accomplished using up to three tons per square inch of pressure in the press.

The press 40 represented by the assembly 41–42 need not be heated to thermally cure the binder as a characteristic feature of the present invention, and it is therefore unnecessary to periodically vent or release the ram 41 in order to permit the escape of volatiles. It may, however, be advantageous to open the press dies once to get rid of entrapped air, trapped by the initial lowering of the ram, and as noted above, I may heat the die merely to maintain the bond at room temperature.

The shoe or like friction element consolidated in the press 40 is virtually devoid of porous areas approaching, as it does, theoretical density. The bond, in a tacky state, maintains this density after removal of the pressed body from the die. In this connection, it may be noted that it is important to press the mixture removed from the hammer mill (if used) as soon as possible and before the adhesiveness and slight tackiness of the partially advanced binder is lost.

The densified shapes removed from the press are to be subjected to a rapid and final cure in order to vulcanize or cure the binder to its final thermally cured state, resulting in the evolution of the volatile products characterizing the chemical reaction that occurs during cure of the bond. This can be done as a mere oven process, especially if expedited by dipping the preforms in a molten metal bath, as hereinafter mentioned, for a time period required to bring the preforms up to oven temperature. Advantageously, however, the final cure is accomplished by submerging the preforms in weighted baskets in a bath of molten metal at 425° F. for approximately one-half hour. The advantage of this is that oxidation, that might occur in the open air during the final cure, is avoided, and submerging the product enables the desired interior temperature to be reached rather quickly.

In any event, no pressure is entailed to maintain density, since it has been found that the adhesive-cohesive power of the bond exceeds the vapor pressure of the evolved gases during final cure. This is what is essential in accordance with my invention. In comparison, it may be mentioned that the final cure therefore specified for friction elements of the kind under consideration produced under conventional compression mold techniques is one of three hours exposure at the final curing temperature under a pressure of one ton per square inch in order to obtain a final cure state and densification comparable to what is achieved under the present invention.

A friction element as produced above is ordinarily affixed in one way or another to a metal backing which in turn enables the friction element to be mounted on a brake head or the like. Advantageously, however, I can simultaneously consolidate the mixture and bond the mixture to a backing in one step. Thus, referring to FIG. 3, a railroad brake shoe in finished form is identified at 50, including a steel back 51 and the essential friction element 52. Such an assembly can be attained, FIG. 4, by first disposing the separate backing on an anvil or fixed die 54 of the press 55 in which is next disposed the mixture 52A containing the partially advanced, warm, adhesive binder as above described in connection with FIG. 2. The anvil is shaped complementary to the geometry of the backing. Thereafter, the ram or movable die 56 is lowered on the mixture 52A with sufficient pressure to establish the desired final density. Again, no heat is required during the stamping operation, and the binder is of sufficient adhesive power to bond the lining 52 to the back 51. After stamping out the assembly in the press apparatus 55, the shoe is removed and subjected to final bond cure resulting in the finished shoe of FIG. 2.

Additional examples illustrating the wide variety of selection of fillers and variations in the thermosetting bond ingredients are as follows:

FILLERS

| Ingredient | Examples (Parts by Weight) | | |
|---|---|---|---|
| | 6 | 7 | 8 |
| Barytes | | | 10 |
| Lead Sulphide | 18 | | |
| Alumina | | 2 | 2 |
| Graphite | 7 | 41.5 | 15 |
| Organic Friction Enhancer | 5 | | |
| Asbestos | 5 | 16.5 | 42 |
| Calcined kyanite | 13 | | |
| Cast Iron | 20 | 25 | |
| Lead | 5 | | |
| Brass Chips | | | 8 |
| Cured Cashew Resin Friction Particles | | | 5 |

BONDS

| | | | |
|---|---|---|---|
| Unvulcanized Butadiene-Styrene Rubber | 3 | | |
| Liquid Cashew Resin (Uncured) | 17 | | |
| Powdered Phenol-formaldehyde resin (incompletely cured) | | 15 | |
| Tung Oil Modified Liquid Phenol-formaldehyde resin | | | 18 |
| Theoretical Specific Gravity | 2.50 | 2.49 | 2.08 |
| Specific Gravity Obtained | 2.45 | 2.36 | 2.05 |

Conventional agents to promote and accelerate rubber vulcanization should be used such as sulphur and zinc oxide; and hexamethylenetetramine may be advantageously employed to promote cure of the cashew resin binder material. In all of these examples, processing is essentially the same as described for Examples 1 to 5, the only variations being in temperature, amount of pressure, and extent of time of applying pressure.

Example 6 can be either mixed and extruded continuously in the above described apparatus, or batch mixed therein. If batch mixed, the liquid cashew resin can be dissolved in toluol; if continuously mixed, this resin can be used with or without a solvent. If a solvent is used, the solvent is hot coming out of the mixer and can be subsequently flushed off before pressing. Solvent flash-off will be complete for all practical purposes (solvent content nil). In any event, the hot mixture of Example 6 (temperature not less than 150° F. nor more than 250° F.) removed from the mixer above described can be fluffed in a hammer mill (as in the instance of all examples disclosed) but is pressed in a substantially solvent-free state, while the binder is still warm and tacky, at high pressure, a ton or more per square inch for about one minute (only fifteen seconds at pressure) depending upon thickness and geometry. The die may be preheated up to 150° F. to avoid chilling the tacky binder. This mixture is then cured with only modest pressure (20 p.s.i.) to maintain shape against thermal warpage for about 1 hour at about 450° F. to about 6 hours at about 350° F.

As for Example 7, the mixture taken from the mixer was at a temperature of 260° F. This relatively high temperature was due to the use of a bond purely in solid form initially and therefore one requiring a good deal of internal work to soften in the absence of a solvent. The die for stamping out the desired shapes from the mixture of Example 7 is pre-heated to 240° F. The pressure was 6000 p.s.i. for 15 to 20 seconds. The densified bodies taken from the press are cured for 7 hours at 450° F. preferably with modest pressure to maintain geometry.

The mixture of Example 8 was homogeneously mixed and the binder spread in the apparatus shown in FIG. 2. Prolonged intensive working to soften the binder was not necessary, since the binder was already of liquid form, but internal working did heat the mixture to about 140° F. to partially advance the resin binder, whereafter the mixture in a warm state, with the binder of partially advanced, adhesive character was formed in a die as above described before the bond lost tackiness. The die was at room temperature and the press conditions were 3000 p.s.i. applied for 1 minute. The densified body was then cured, without the need for pressure to maintain density, for 12 hours at a temperature from 200° F. increasing gradually to 375° F. followed by 375° F. maintained for 6 hours.

A satisfactory friction element can be produced in accordance with Example 8 while using a binder in the form of a mixture of Buna-S and depolymerized natural rubber. It will be seen from the foregoing that the present invention may be practiced by an intense raking and gyrating action on essentially dry particles in a substantially confined chamber which particles are those required for a thick friction element of at least one inch in thickness, including a thermoset binder phase or matrix in which are dispersed solid, filler particles displaying the desired wear and friction characteristics. The gyrating action assures homogeneity and spreading of the binder as well as constant movement toward the discharge end of the chamber 20, and the multi-directional raking action, occurring against the resistance of the dry product mixture, the resistance of the ribs 25 and the resistance of the walls of the chamber, ultimately softens the binder particles so that they can be spread, and at the same time partially heat advanced. I may also close the discharge opening of the apparatus shown in FIG. 1 and prepare batch mixtures therein, rather than continuous extrusions.

Irrespective of the specific form of mixer or pressing apparatus, my process is one in which the mixture undergoing consolidation to final density is free of solvent and has a thermosettable organic bond in a partially advanced stage of cure, but still warm (purposely above room temperature) plastically deformable, tacky and adhesive state, retaining density, such that when pressed to final density the pressed body does not spring back or expand to any appreciable degree. Under no circumstances is the binder advanced to a state where it is no longer flowable or where it is not adhesive, although the binder in the mixture when pressed has had removed therefrom most of the gases that characterize cure reaction. Conversely, I do not further cure the binder to evolve gases of cure reaction to any appreciable degree when pressing the mixture to final density which, it may be observed, in all instances will be at least about 95 percent of theoretical density. This same density prevails when the densified body is relieved of the compacting pressure, however established, and the densified body thus relieved of compacting pressure is then cured to harden the binder to its insoluble, infusible stage without the need to maintain density by further densifying pressure during final cure even though volatile products are evolved during final cure.

Hence, while the present invention has been described from the standpoint of preferred examples and procedures, it will be appreciated that these are capable of variations and modification still within the purview of the claims of the present invention.

I claim:

1. A method of producing a friction element composed of a mixture of solid filler particles and a thermally set binder obtained from an organic bond which increases in tackiness when sufficiently heated and becomes hard when further heated in a final cure, comprising: preparing such a mixture in a homogeneous state with the binder in an incompletely cured condition and spread substantially uniformly throughout the filler particles; thermally advancing the binder in such mixture to evolve gases of reaction while maintaining the binder in a warm, flowable, adhesive state and, while the binder is still warm and in such a state and substantially devoid of any solvent, compacting the mixture to its final density without thermally advancing the binder to a cure stage where volatiles are evolved to any appreciable degree; and thereafter relieving the densified mixture of compacting pressure and subjecting the densified mixture in its relieved state to a complete thermal cure to harden the binder.

2. A method according to claim 1 wherein the final density is at least about 95% theoretical density.

3. A method according to claim 2 wherein a solvent for the binder is employed when preparing the homogeneous mixture, but which is removed prior to pressing the mixture to its final density.

4. A method according to claim 2 wherein no solvent is employed and wherein the incompletely cured binder is spread and thermally softened to its warm, flowable, adhesive state by intense mechanical work exerted on the mixture.

5. A method according to claim 2 wherein the mixture is consolidated to final density in a die.

6. A process for producing composition friction elements composed of solid filler particles and a thermally set binder obtained from solid bond particles which soften when sufficiently heated comprising: introducing the filler and bond particles into a chamber having an opening therein through which a product including said filler and bond particles is to be forced; churning the contents in the chamber, while progressively moving the contents being churned toward said opening, with an intensity that generates so much heat through friction that the solid bond ingredients soften and spread uniformly on and throughout the filler particles, thereby creating a homogeneous product having a uniformly distributed binder, continuously forcing said homogeneous product through said opening; pressing a selected amount of said product to a highly dense state in a die cavity having the shape desired for the friction element; and subjecting the shaped body to sufficient heat to impart a final thermal cure to the binder phase thereof.

7. A process for producing elements composed of solid filler particles and a thermally set binder obtained from solid bond particles which soften when sufficiently heated comprising: introducing the filler and bond particles into a chamber having an opening therein through which a product including said filler and bond particles is to be forced; churning the contents in the chamber, while progressively moving the contents being churned toward said opening, with an intensity that generates so much heat through friction that the solid bond ingredients soften and spread uniformly on and throughout the filler particles, thereby creating a homogeneous product having a uniformly distributed binder; continuously forcing said homogeneous product through said opening; pressing to the desired shape a selected amount of said product in a die cavity; and subjecting the shaped body to sufficient heat to impart a final thermal cure to the binder ingredients.

8. A method of producing a friction element composed of a mixture of solid filler particles and a thermally set binder obtained from an organic bond which increases in tackiness when sufficiently heated and becomes hard when further heated in a final cure, comprising: preparing such a mixture in a homogeneous state with the binder in an incompletely cured condition and spread substantially uniformly throughout the filler particles; thermally advancing the binder in such mixture to evolve gases of reaction while maintaining the binder in a flowable, adhesive state; and, while the binder is still in said state, compacting the mixture to its final density without thermally advancing the binder to a cure stage where volatiles are evolved to any appreciable degree; and thereafter relieving the densified mixture of compacting pressure and, while the binder is in said state, subjecting the densified mixture in its relieved state to a complete and final thermal cure to harden the binder manifest in the evolution of gases, the binder in said state displaying adhesive strength in excess of the vapor pressure of gases evolved during final cure of the binder whereby the density of the finally cured product is substantially the final density attained during compaction.

References Cited

UNITED STATES PATENTS

| | | | |
|---|---|---|---|
| 2,185,333 | 1/1940 | Denman | 264—122 X |
| 2,460,830 | 2/1949 | Kovacs. | |
| 2,860,961 | 11/1958 | Gregor | 264—122 X |

ROBERT F. WHITE, *Primary Examiner.*

R. B. MOFFITT, *Assistant Examiner.*